Patented Aug. 26, 1952

2,608,552

UNITED STATES PATENT OFFICE 2,608,552

INHERENTLY PROCESSABLE INTERPOLYMERS OF VINYL CHLORIDE, A HIGHER ALKYL ACRYLATE, AND AN ACRYLIC NITRILE

Robert J. Wolf and Anthony A. Nicolay, Cleveland, Ohio, assignors to The B. F. Goodrich Company, New York, N. Y., a corporation of New York No Drawing. Application February 1, 1950, Serial No. 141,862

3 Claims. (Cl. 260—80.5)

The present invention relates to interpolymers obtained by the polymerization of monomeric mixtures containing at least three monomeric components, each in particular proportions, one of which is vinyl chloride, another of which is a higher alkyl acrylate such as an octyl acrylate, and a third of which is a nitrile of an acrylic acid such as acrylonitrile, methacrylonitrile and the like, which interpolymers possess various new and useful properties, especially in regard to their excellent strength, resistance to the effects of light and heat, good low temperature flexibility, and resistance to the effects of fats and oils; and it pertains more specifically to three-component interpolymers or tripolymers of these three types of monomers which are clear, strong, tough, and flexible yet are processable without the addition of plasticizers.

Vinyl resins such as polyvinyl chloride, and copolymers of vinyl chloride with various other monoolefinic monomers such as vinylidene chloride, vinyl acetate, methyl acrylate, acryonitrile and diethyl fumarate are well known to the art are widely used in various familiar applications. In using such resins it is the practice to first mix the thermoplastic resin, which by itself is normally hard and horny at normal temperatures and is generally incapable of being easily subjected to processing or forming operations, with considerable quantities of liquid plasticizers such as dibutyl phthalate, di-2-ethylhexyl phthalate, or tricresyl phosphate, thereby to obtain a plasticized composition which can be more easily processed and worked into the final shape.

There are, however, several disadvantages necessarily attending the use of plasticizers. The plasticizers commonly employed are oily, liquid materials which, even when thoroughly mixed with the vinyl resin and then heated to insure complete absorption of the plasticizer by the resin (ordinarily called "plasticization" of the resin), have a strong tendency to "bleed" or migrate to the surface of the resin composition where they are lost through wiping, washing or volatilization, with the result that the composition gradually stiffens as the plasticizer is removed until a point is reached where the composition fails by tearing, cracking, etc. Under exposure to hot soapy water such as is encountered by plastic shower curtains, tablecloths, baby pants and the like, the oily plasticizer is extracted by the soapy water at a greatly accelerated rate such that the composition becomes stiffened and useless in an unduly short time. Other defects of plasticized vinyl resins include the difficulty in achieving a lasting adhesive bond between the surface of a plasticized vinyl resin composition and another surface because the oily plasticizer migrates to the adhesive layer and destroys the bond. Varnished or lacquered surfaces are also marred on prolonged contract with an article made of plasticized vinyl resin because the thin film of plasticizer always present on the plastic articles is also a softener for the lacquer or varnish resin. A further disadvantage is that only plasticizers must normally be incorporated into a vinyl resin by an expensive and time-consuming milling or mixing operation.

A still further limitation of known plasticized resin compositions is the fact that when plasticized with sufficient plasticizer to be easily processed, they are insufficiently strong, tough and rigid at normal temperatures to be used in a number of important applications.

It is a primary object of this invention, therefore, to provide a new class of vinyl resins each member of which is possessed of many of the desirable properties possessed by known vinyl resins and plasticized vinyl resin composition and, in addition, is so inherently processable that the addition of extraneous plasticizers is not required either for processing or for good plastic properties in the final product, and which on that account can be employed to produce numerous articles which are more durable, serviceable, and otherwise more desirable than similar articles of conventional vinyl resins. It is also an object to provide new vinyl resins which are processable without plasticizer and which at normal temperatures possess improved toughness and strength, thereby to be useful over a wider range of applications than conventional plasticized vinyl resins. The achievement of these and still other objectives will become apparent in the description of the invention which follows.

We have found that by polymerizing, preferably in an aqueous medium, monomeric mixtures containing at least three components, each in definite proportions, one being vinyl chloride, another an alkyl acrylate the alkyl group of which contains from 5 to 10 carbon atoms, preferably an octyl acrylate, and a third a nitrile of an acrylic acid such as acrylonitrile, we are able to obtain novel interpolymers having the properties necessary for achieving the above and other objectives.

The relative proportions of the three types of monomers in the monomeric mixture employed in the production of our new interpolymers are somewhat critical, since the desired properties are not secured with these monomers in all proportions, but may vary considerably within certain limits. In the monomeric mixture we have found it necessary to employ from 35 to 90% by weight of vinyl chloride, from 5 to 65% by weight of the higher alkyl acrylate, and from 2 to 40% by weight of the acrylic nitrile, with at least 90% by weight of the monomeric mixture being made up of these three ingredients. Other mono-olefinic monomeric materials such as vinylidene chloride, diethyl maleate, styrene, isobutylene, the lower alkyl acrylates such as methyl and ethyl acrylate and others are, if desired, utilizable to the extent of 10% by weight of the mixture. However, it is preferred that only monomeric materials of the three specified types be present. Particularly valuable as soft inherently processable materials are the tripolymers, that is, polymers made from three componet monomeric mixtures containing from 50 to 60% by weight of vinyl chloride, from 20 to 40% by weight of the higher alkyl acrylate and from 2 to 20% by weight of the acrylic nitrile.

The acrylic nitrile used in this invention may be any nitrile of acrylic or an alpha-alkyl or alpha-halo acrylic acid among which are acrylonitrile, methacrylonitrile, ethacrylonitrile, chloroacrylonitrile, etc. Acrylonitrile, by reason of its low cost and ready availability and by reason of its forming excellent interpolymers with vinyl chloride and the higher alkyl acrylates, is greatly preferred.

The higher alkyl acrylates which are employed in this invention are those alkyl esters of acrylic acid in which the alkyl group contains a chain of from 5 to 10 carbon atoms. We have found that the degree of plasticity or inherent processability imparted to our new interpolymers by these higher alkyl acrylates is largely determined by the length and configuration of the alkyl group in the alkyl acrylate and that this corresponds in a qualitative manner with the observed degree of plasticization imparted to ordinary vinyl resins by addition of ester-type plasticizers containing the same or similar alkyl groups. For example, di-2-ethylhexyl phthalate is an excellent plasticizer for vinyl chloride polymers and 2-ethylhexyl acrylate has been found to produce interpolymers with vinyl chloride and acrylonitrile which are easily processed without plasticizer or without being heated to high temperatures. Illustrative higher alkyl acrylates within the above class utilizable in this invention are n-amyl acrylate, n-hexyl acrylate, isohexyl acrylates, isoheptyl acrylate, n-heptyl acrylate, capryl acrylate (1-methyl-heptyl acrylate), n-octyl acrylate, 2-ethylhexyl acrylate, isooctyl acrylates such as 6-methyl-heptyl acrylate, n-nonyl acrylate, isononyl acrylate, isononyl acrylates such as 3,5,5-trimethylhexyl acrylate, n-decyl acrylate and others.

It is greatly preferred to employ higher alkyl acrylates in which the alkyl group contains a total of 8 to 10 carbon atoms and possesses a carbon chain of 6 to 10 atoms. Compounds within this class are 6-methylheptyl acrylate, 3,5,5-trimethylhexyl acrylate, 2-ethylhexyl acrylate, capryl acrylate (1-methylheptyl acrylate), n-octyl acrylate and others. The higher alkyl acrylates of this class impart a high degree of inherent processability to our new interpolymers and the compound most efficient in this respect is n-octyl acrylate.

The polymerization to form our new interpolymers may be carried out in any conventional manner, although polymerization in an aqueous medium is greatly preferred. Polymerization in an aqueous emulsion, which may or may not contain an added emulsifying agent, is of course essential when a latex of the interpolymer is the desired end-product. In addition to this preferred method, the mixture of monomers may be polymerized by the "pearl" type suspension method in the presence of a material having colloidal protective properties such as bentonite clay, gelatin, polyvinyl alcohol, polyacrylic acid, a water-insoluble phenol-aldehyde or urea-aldehyde resin or the like. By this method the interpolymer is obtainable in a fine granular form. The polymerization may also be carried out in the presence of a solvent or diluent other than water. In the latter method the polymer is obtained either as a fine granular precipitate or as a solution in the solvent depending on the choice of solvent. Polymerization may also be carried out in the absence of solvent or diluent to yield a solid mass of interpolymer.

Whatever method of polymerization is employed a catalyst is generally required. The catalyst may be any of the catalysts commonly employed for the polymerization of vinyl and vinylidene compounds. Actinic radiation may be employed, as well as the various peroxygen compounds such as hydrogen peroxide, benzoyl peroxide, o,o'-dichlorobenzoyl peroxide, caproyl peroxide, caprylyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, potassium and ammonium persulfate, sodium perborate, sodium percarbonate and others. These oxidizing catalysts reach their fullest activity when used in combination with a reducing substance such as sodium sulfite, sodium thiosulfate, a polyhydroxy phenol such as resorcinol or the like, in what is generally referred to as a "redox" polymerization. Such polymerizations are often greatly activated by the presence of a small amount of a heavy metal salt such as silver nitrate, copper sulfate or various ferric and cobalt compounds and others.

It may sometimes be desirable to control or adjust the hydrogen ion concentration of the polymerization mixture, which tends to become more acid during the polymerization due to liberation of HCl. It is preferred in some cases, therefore, that there be added to the reaction mixture a buffering substance such as sodium bicarbonate, trisodium phosphate, ammonium hydroxide, sodium hydroxide, the amino-substituted alcohols such as 2-amino-2-methyl-1-propanol or the like.

Any of the usual emulsifying agents may be employed when the polymerization is carried out in aqueous emulsion. Ordinary alkali-metal, ammonium and alkanolamine fatty-acid soaps such as sodium oleate, sodium myristate, potassium palmitate, ammonium stearate, ethanolamine laurate and the like as well as rosin or disproportionated rosin acid soaps may be used, but more useful latices are secured with the synthetic emulsifying agents including the hymolal sulfates and sulfonates such as sodium lauryl sulfate, sodium cetyl sulfate, the sodium salts of sulfonated paraffin oil, the sodium salts of dodecane-1-sulfonic acid, octadecane-1-sulfonic acid, etc.; alkaryl sulfonates such as the sodium alkyl benzene sulfonates, sodium isopropyl naphthalene sulfonate, sodium isobutyl naphthalene sulfonate, and the like; alkali-metal salts of sulfonated dicarboxylic acid esters and amides such as sodium dioctyl sulfosuccinate, sodium-n-octadecylsulfosuccinamate, the sodium salt of n-octadecyl-N-(1,2-dicarboxyethyl) sulfosuccinamate and the like; and salts of organic bases containing long carbon chains, for example, the hydrochloride of diethylaminoethyl-oleylamide, lauryl amine hydrochloride, and the like. The salts of the organic bases (also called anionic soaps) yield acidic emulsions and the fatty-acid soaps yield alkaline emulsions, whereas the hymolal sulfates and sulfonates, which are particularly preferred, may be utilized in emulsions over a wide pH range. In addition to the above emulsifiers which are polar or ionic in nature, still other materials which may be used singly or in combination with one or more of the above-named emulsifying agents include non-ionic emulsifiers such as the polyether alcohols prepared by condensing ethylene oxide with higher alcohols and the like.

While the polymerization may be carried out in the presence of air, the rate of reaction is ordinarily faster in the absence of oxygen and hence polymerization in an evacuated vessel or under an inert atmosphere is to be preferred. The temperature at which reaction is carried out is not critical, it may be varied widely from −30 to 100° C. or higher, though best results are generally obtained at a temperature of about 0° C. to about 70° C.

In the polymerization of the monomeric mixture according to this invention it may be desirable to withhold portions of the monomers for addition during the course of the reaction. The monomers may also be premixed and the mixture added in increments or continuously during the reaction period. The aqueous emulsion polymerization may also be effected in the presence of a small quantity of a previously prepared vinyl resin latex in order to obtain larger latex particles and greater fluidity for a given latex solids content. By such a method latices of the interpolymers may be made having high fluidity and over 50% total solids content, which are greatly to be desired for use in coating, dipping and impregnating operations and in the casting of unsupported film.

The preparation of the interpolymers of this invention, their properties and representative uses thereof will be more clearly described in the following specific examples which are intended merely as illustrations of the nature of our invention and not as limitations on the scope thereof.

*Example I*

A tripolymer was prepared by the polymerization of the monomeric materials contained in a reaction mixture prepared as follows:

| Materials: | Parts/wt. |
|---|---|
| Vinyl chloride | 60.0 |
| 2-ethylhexyl acrylate | 20.0 |
| Acrylonitrile | 20.0 |
| Potassium persulfate | 1.2 |
| Emulsifier[1] | 4.0 |
| Ammonia | 0.2 |
| Water | 94.6 |

[1] A sodium salt of a sulfonated petroleum oil fraction known commercially as "Duponol 189-S."

The water, emulsifier and potassium persulfate were charged to a reaction vessel, the vessel evacuated, and then the ammonia and monomers added. The resulting mixture was maintained at 50° C. with constant agitation for 22 hours. The product was a stable fluid latex containing 44.5% total solids. A sample of the latex was coated on a clean glass plate, allowed to dry, and heated at 150° C. for several minutes whereupon an excellent, clear, strong and flexible film was obtained. The film possessed excellent resistance to greases and oils.

Another sample of the latex was coagulated by the addition of salt and acid to produce a fine granular tripolymer resin. The resin milled smoothly on a two-roll mill at only 170° F. to produce a strong, flexible sheet. The stability of the tripolymer resin to sunlight was tested by a method utilizing the well-known tendency of a vinyl resin to become opaque and discolored upon exposure to ultraviolet light. By this method the tripolymer was dissolved in tetrahydrofurfural, the resulting clear solution of the tripolymer was coated on a clean glass microscope slide and allowed to dry. The light transmitted through the coated portion of the slide was measured before and after exposure for 4 hours to the powerful mercury vapor ultraviolet lamp in a fadometer and the ratio of the light transmitted after exposure to that of the unexposed film, expressed in percent, compared to a similarly treated film of polyvinyl chloride. The light transmission of the so-treated tripolymer was 82% while that of similarly exposed polyvinyl chloride was only 60%.

*Example II*

Another tripolymer was made by polymerizing in an aqueous emulsion at 50° C. (using the procedure and recipe of Example I) a mixture consisting of 40% by weight of vinyl chloride, 45% by weight of 2-ethylhexyl acrylate, and 15% by weight of acrylonitrile. The product was a stable latex containing 50% total solids. The latex was coagulated by the salt acid method and the resulting fine granular coagulum dried under vacuum. The dry coagulum was found to band smoothly into a soft, flexible and clear sheet on a two-roll plastic mill having its rolls maintained at only 170° F. While the plastic sheet was on the mill 2% by weight of the mixed cadmium salts of fatty and naphthenic acids were incorporated. The sheet was removed from the mill and the plastic material press-molded for 3 minutes at 300° F. The press-molded sheets had a hardness of 86 (Durometer A at 30° C.), a brittleness temp. of −50° F., a tensile strength of 1700 lbs./sq. in. and an elongation of 260%.

When the tripolymer of this example was tested for light stability as in Example I, it was found to possess a light stability of 90%.

*Example III*

A tripolymer was prepared by polymerizing the monomeric materials contained in an aqueous suspension having the following composition:

| Material: | Parts/wt. |
|---|---|
| Vinyl chloride | 50.0 |
| Isooctyl acrylate | 40.0 |
| Acrylonitrile | 10.0 |
| Gelatin | 0.5 |
| Lead acetate | 0.5 |
| Caproyl peroxide | 1.2 |
| Water | 200.0 |

Polymerization was complete on agitation of this suspension for 18 hours at 55° C. The product was a fine granular "pearl" type tripolymer which, after being dried in an air oven at 90° C., was press-molded, without plasticizer or mill warm up, in one minute at 130° C. to form a tough but flexible, completely fused disc. By way of comparison, unplasticized polyvinyl chloride can not be so press-molded and plasticized polyvinyl chloride containing up to 50 parts of di-2-ethylhexyl phthalate requires a molding cycle of 3 minutes at 350° F.

The press-molded sheet of tripolymer had a hardness of 78 (Duro. A), a tensile strength of 1600 lbs./sq. in., an elongation of 310% and an ASTM brittleness temperature of −50° F.

The tripolymer of this Example III possessed a light stability when tested as in Example I of 95%. It also showed great resistance to high temperatures in a heat stability test similar to the light stability test. Thus, the per cent light transmission after exposure of the film for 24 hours in a mechanical convection air oven at 175° C. was 92%. In the same test polyvinyl chloride showed a per cent light transmission of only 50%.

In still another manner the surprising heat resistance of the tripolymer of this Example III was demonstrated. When a plasticized vinyl resin composition is heated in an air oven for 168 hours (7 days) at 100° C. the composition suffers a 5 to 25% loss in weight (loss of plasticizer or chemical breakdown or both), a permanent decrease in tensile strength and modulus at 100% elongation, and either a great permanent decrease or increase in elongation. For example, a sample of polyvinyl chloride plasticized with 35 parts of di-2-ethylhexyl phthalate and containing 2½% by weight on the polyvinyl chloride of a stabilizer consisting of the mixed cadmium salts of fatty acids and naphthenic acids, suffered after such heat treatment, a 5 to 10% decrease in weight, up to 100% decrease in elongation and a decrease in 100% modulus of 30%. A sample of the tripolymer of Example III, similarly stabilized, and similarly exposed to the heat treatment, however, showed a zero loss in weight and no change in tensile strength, elongation or modulus.

*Example IV*

Another tripolymer was produced by subjecting the following mixture to polymerizing conditions:

| Material: | Parts/wt. |
|---|---|
| Vinyl chloride | 55.0 |
| 2-ethylhexyl acrylate | 40.0 |
| Acrylonitrile | 5.0 |
| Potassium persulfate | 1.3 |
| Emulsifier (same as Ex. I) | 4.0 |
| NH₃ | 0.2 |
| Water | 94.5 |

Polymerization was complete within 40 hours at 50° C. The resulting latex contained about 50% total solids. The coagulated polymer formed a clear, soft and flexible, and completely fused disc after press-molding for only 1 minute at 130° C. The tripolymer formed a smooth band, without plasticizer, on a mill having its rolls maintained at only 150° F. A sheet of the tripolymer press-molded 3 minutes at 300° F. had a hardness of 70 (Duro. A) and had a surprisingly low ASTM brittleness temperature of −70° F.

*Example V*

A tripolymer was made by polymerizing the monomeric materials contained in a monomeric mixture of the following proportions:

| Material: | Parts/wt. |
|---|---|
| Vinyl chloride | 85.0 |
| 2-ethylhexyl acrylate | 10.0 |
| Acrylonitrile | 5.0 |
| Potassium persulfate | 1.3 |
| Emulsifier (same as Ex. I) | 4.0 |
| NH₃ | 0.2 |
| Water | 94.5 |

Polymerization was complete in 39 hours at 50° C. with the production of an excellent white latex containing 53.6% total solids. The tripolymer obtained therefrom was capable of being milled, molded, and extruded without plasticizer. It had a light stability of 80% and a heat stability of 90%. A molded disc of the tripolymer was hard and stiff, yet was clear and smooth.

*Example VI*

Another tripolymer was prepared by polymerizing the monomeric materials contained in the following mixture:

| Material: | Parts/wt. |
|---|---|
| Vinyl chloride | 60.0 |
| Isononyl acrylate | 38.0 |
| Acrylonitrile | 2.0 |
| Emulsifier (same as Ex. I) | 4.0 |
| Potassium persulfate | 1.3 |
| NH₃ | 0.2 |
| Water | 94.5 |

The polymerization reaction was complete in 40 hours at 50° C. The resulting tripolymer had a hardness of 94 Durometer A, a tensile strength of 2200 lbs./sq. in., an elongation of 400%, and a 100% modulus of 1600 lbs./sq. in. The ASTM brittleness temperature of the tripolymer was −50° F. This tripolymer was capable of being milled without plasticizer at 150° F.; of being extruded without plasticizer at 240° F., and of being calendered, without plasticizer, at 210° F. Polyvinyl chloride plasticized to a similar hardness requires milling temperatures of 280 to 300° F., extruding temperatures of 390 to 400° F., and calendering temperatures of at least 340° F.

*Examples VII to IX*

Three monomeric mixtures, the first containing 60% by weight of vinyl chloride, 25% of 2-ethylhexyl acrylate, 10% of acrylonitrile, and 5% of ethyl acrylate; the second containing 65% vinyl chloride, 30% 2-ethylhexyl acrylate and 5% acrylonitrile; and the third containing 65% by weight of vinyl chloride, 15% acrylonitrile, 10% 2-ethylhexyl acrylate, and 10% styrene were polymerized in the recipe of Example I to produce in each case an interpolymer in latex form. The latex of the 60/25/10/5 tetrapolymer containing ethyl acrylate formed a good film when heated to only 100 or 150° C. The heat stability of this tetrapolymer was 66% and its light stability 95%. The 65/30/5 tripolymer had a milling temperature of 150° F., a tensile strength of 2100 lbs./sq. in., an elongation of 250%, a modulus at 100% elongation of 1000 lbs./sq. in., and a hardness of 65 (Duro. C). The 65/15/10/10 tetrapolymer containing styrene formed good films at 150° C. and had a light stability of 90%.

While the invention has been described with particular reference to certain preferred embodi-

We claim:

1. An interpolymer made by polymerizing a mixture of monomeric materials comprising from 50 to 60% by weight of vinyl chloride, 20 to 40% by weight of an alkyl acrylate in which the alkyl group contains from 5 to 10 carbon atoms, and from 2 to 20% by weight of an unsaturated nitrile selected from the class consisting of the nitriles of acrylic acid, alpha-alkyl acrylic acids and alpha-halo acrylic acids, at least 90% by weight of said mixture being made up of the enumerated ingredients.

2. A tripolymer made by polymerizing a mixture of monomeric materials consisting of from 50 to 60% by weight of vinyl chloride, 20 to 40% by weight of an alkyl acrylate in which the alkyl group contains a total of 8 to 10 carbon atoms and possesses a carbon chain of 6 to 10 carbon atoms, and 2 to 20% of acrylonitrile.

3. A tripolymer made by polymerizing a mixture of monomeric materials consisting of from 50 to 60% by weight of vinyl chloride, 20 to 40% by weight of 2-ethylhexyl acrylate, and from 2 to 20% by weight of acrylonitrile.

ROBERT J. WOLF.
ANTHONY A. NICOLAY.

REFERENCES CITED

The following references are of record in the file of this patent:

UNITED STATES PATENTS

| Number | Name | Date |
|---|---|---|
| 2,140,048 | Fikentscher et al. | Dec. 13, 1938 |
| 2,462,422 | Plambeck | Feb. 22, 1949 |
| 2,486,241 | Arnold | Oct. 25, 1949 |
| 2,510,426 | Smith | June 6, 1950 |

FOREIGN PATENTS

| Number | Country | Date |
|---|---|---|
| 685,257 | Germany | Dec. 14, 1939 |

OTHER REFERENCES

Rehberg et al., article in Ind. Eng. Chem., August 1948, pages 1429–1433.